Patented Nov. 5, 1940

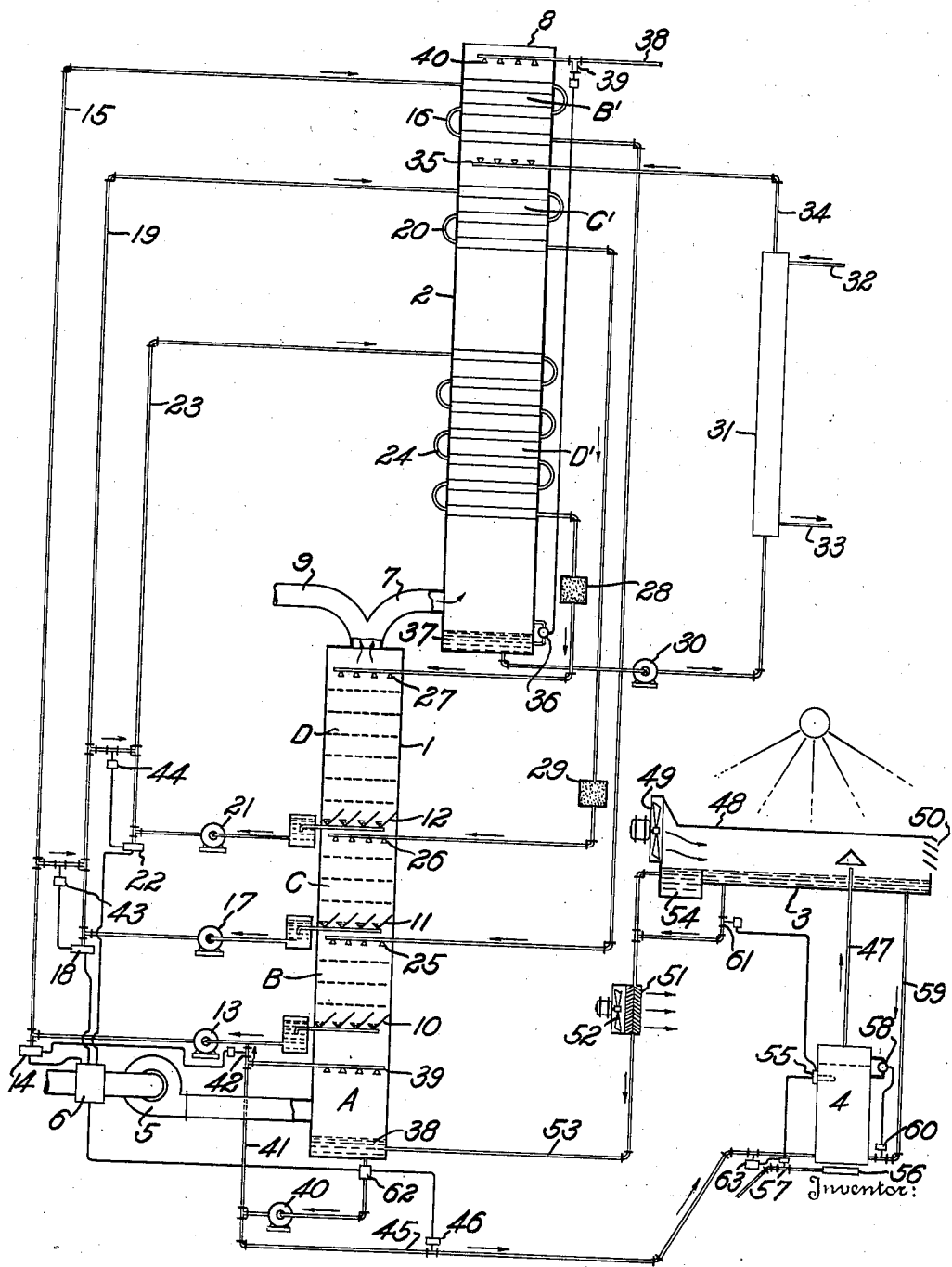

2,220,219

UNITED STATES PATENT OFFICE 2,220,219

REGENERATIVE COOLING SYSTEM

Robert B. P. Crawford, Miami, Fla.

Application November 17, 1937, Serial No. 175,106

14 Claims. (Cl. 62—2)

This invention relates to method and apparatus for the cooling of air and water and is particularly directed to the application of the regenerative principle of cooling disclosed in my U. S. Patent No. 2,057,938 to multiple stage cooling of air and water and to the efficient utilization of solar energy for the cooling of air and water.

A principal object of the invention is the provision of a multiple stage regenerative method and apparatus for the cooling of air and water.

A further object is the provision of a method and apparatus for effectively utilizing the energy of solar radiation for the cooling of air and water.

It has been found that regenerative cooling of very high efficiency may be obtained by passing a stream of air in contact with successive portions of a hygroscopic liquid of decreasing temperature, progressively cooling a stream of water by the evaporative cooling effect of at least a part of said stream of air passed in countercurrent contact with the stream of water, and removing heat from at least the cooler portions of said hygroscopic liquid by bringing portions of the hygroscopic liquid of successively lower temperature into heat exchange relation with sections of said stream of water of successively lower temperature.

In the embodiment of the invention which will be more particularly described for the purpose of illustration, four stages of heat transfer are incorporated using a solution of calcium chloride as the hygroscopic agent and producing air at a temperature of 40° F. and a dew point of 29° F. and water at a temperature of 40° F. In the illustrative embodiment there is also included means for utilizing solar energy for removing from the diluted hygroscopic agent at least a portion of the moisture absorbed by it from the air.

The illustrative form of invention will be described with reference to the accompanying drawing showing semi-diagrammatically apparatus embodying the principles of the invention.

In the drawing 1 is a multistage cooling and dehumidifying tower, 2 is a multistage regenerative cooling tower, 3 is a solar evaporator and 4 is a heater.

Air at 100° F. temperature and 72° F. dew point is drawn by fan 5 through dew point master control 6 and caused to pass through dehumidifying tower 1. A portion of this air is passed through 7 into regenerative tower 2 and out at 8 into the atmosphere. If the cooled, dry air diverted at 9 is used for conditioning an enclosure and an equivalent amount of air is returned from the enclosure to fan 5, an amount of air from the outside atmosphere equivalent to that escaping at 8 must also be supplied to fan 5.

The concentration of the calcium chloride solution in lowest stage (air entering stage) A is approximately 55% at 110° F. Calcium chloride solution in the next stage B is approximately 50% at 87° to 95° F., calcium chloride solution in stage C is approximately 40% at 58° to 75° F. and the solution in the top stage D is approximately 35% at 38° to 55° F. The lengths of the stages, area of contact surface exposed and differentials in vapor pressure between solution and air can be altered to suit any desired condition of design. Thus the amount of work done per stage can be varied and need not be the same in each of the stages.

Most of the brine is separated into the desired stages by drip baffles 10, 11 and 12 although bubble towers or any other effective construction can be used for this purpose. Brine from stage B at approximately 95° F. is pumped by pump 13 past compensated thermostat 14 through line 15 to coils 16 in top stage B' of tower 2. Likewise brine from stage C goes through pump 17, thermostat 18 and line 19 to coils 20, and brine from stage D goes through pump 21, thermostat 22 and line 23 to coils 24. Cooled brine from coils 16, 20 and 24 is returned to distributors 25, 26 and 27 respectively in tower 1 at temperatures of 87° F., 58° F. and 38° F., respectively. Inasmuch as it is desired to work with substantially saturated solutions and since there is a small amount of brine wastage on evaporation, segregated solid calcium chloride is introduced in containers 28 and 29 as close to distributors 27 and 26 as is practical in order to saturate these solutions.

Cold water at approximately 40° is avilable at the bottom of the tower 2 and is pumped by pump 30 through exchanger 31 where fluid entering at 32 is chilled and delivered at 33. Depending on the range through which the fluid is desired to be cooled, the water is delivered to the tower 2 at the proper temperature level. It has been assumed that the fluid entering 31 at 32 will be warm enough to heat the water to 75° F. hence it is delivered to the tower through sprays 35 at the 75° level. If the water issuing from 31 at 34 were cooler it would be fed to the tower at its corresponding temperature level. While it has been found that it is extremely difficult to spray the water up from 35 through coils 16 to wet all the way through, this result can be accomplished by proper air velocity and spacing of the coils so that air spaces coincide vertically. It is also advisable to introduce makeup water at the proper temperature level. For this purpose, assuming 95° F. makeup water, float control 36 keeps the level in pan 37 at the desired point by admitting water from source 38 through valve 39 to distributor 40. Water eliminators can be placed at 8 or the air velocity can be decreased so that water will fall back down the tower being cooled gradually all the way down to pan 37.

The brine of highest temperature and concentration collecting in pan 38 of tower 1, is recirculated to distributor 39 through pump 40 and line 41. Diversion of brine from stages of higher to stages of lower temperature and concentration in order to control more effectively the temperatures and concentrations in the successive stages is effected through valves 42, 43, 44 actuated by thermostats 14, 18 and 22, respectively.

For example, when the temperature of the brine in circuit B B' falls below a predetermined point, which point may be automatically varied with changing load by the action of dew point master controller 6, the thermostat 14 actuates motor mechanism to open valve 42 whereby warm concentrated brine from stage A is admitted into circuit B B'.

Master controller 6 is advantageously set to modulate the action of thermostats 62, 14, 18 and 22 successively as the proportionate load on each stage decreases, as indicated by decreasing dew point at the controller 6.

This modulation is effected by means of a dew point thermostat sensing the dew point of the entering air, and causing controller 6 to vary the operating point of the thermostats, so that as the dew point decreases, indicating a decreased load on the system, the valves 46, 42, 43 and 44 are caused to open at lower temperatures corresponding to the decreased loads on the successive stages.

The strongest brine in stage A in contactor 1 is kept up to concentration by delivering a portion through line 45, valve 46, controlled by compensated thermostat 62, concentrator 4 and line 47 to sun pan 3. Sun pan 3 provides a suitable surface exposed to the sun's rays. As the brine is warmed up through transparent cover 48, fan 49 removes the evaporated moisture through exhaust louvres 50 which keep out rain. Instead of forcing air in with a fan, the sun pan may be set in the direction of the prevailing winds if in a favorable location and natural air currents will carry off the evaporated water vapor. I have found that the solution comes out of such an arrangement at approximately 135° F. in the southwestern United States, hence dry air cooler 51 actuated by fan 52 is provided for chilling the concentrated brine back to 110° F. and returning it through pipe 53 to tower pan 38. For cloudy days I provide a storage reservoir 54 which is of sufficient volume to hold enough concentrated brine to take care of the maximum period of cloudy weather in any locality and typically has a much greater volume capacity than pan 3. For locations which are not usually sunny, a concentrator 4, which may be a boiler, air evaporator, electro-separating cell or other means for the removal of water from the hygroscopic liquid, is provided in addition to or instead of the sun pan.

As shown, the concentrator is a fuel heated boiler. In combination with the boiler 4, there is provided a boiling point thermostat 55, fuel burner 56, fuel control 57, thermostat 63, boiler level control 58, equalizing line 59 and control valve 60. When the level of the brine in the boiler falls for any reason below the lower inlet of control 58, the control causes valve 60 to open and permit brine to flow from pan 3 into the boiler until the level reaches the upper inlet of control 58, when the control again closes valve 60. The exposure of the hot brine in pan 3 to air currents passing from 49 to 50 will further dry the hot solution while the solution is being cooled provided the solution is removed from pan 3 before it has cooled enough to start abstracting water from the air. Boiling point thermostat 55 fixes the concentration at the boiler and by-pass valve 61 opens to drain stored brine from pan 3 so that the hot brine will not have a chance to cool to equilibrium temperature before passing to indirect cooler 51.

The method and apparatus of the invention may obviously be varied to a wide degree within the scope of the appended claims and may, of course, be operated so that all of the available cooling effect is utilized in cooling air or in cooling water or in any desired proportion of cooled air and water by suitably varying the proportion of cooled, dehumidified air from the contactor tower which is passed to the regenerative tower.

Instead of calcium chloride solutions, other hygroscopic compositions may be used such as lithium chloride, zinc chloride and the like, with suitable changes in the proportions of the apparatus to produce the desired result in correspondence with the varying hygroscopicity of the substance used as is well understood in the art.

I claim:

1. A method of cooling air and water which comprises passing a stream of air in contact with successive portions of a hygroscopic liquid of decreasing temperature, progressively cooling a stream of water by the evaporative cooling effect of at least a part of said stream of air passed directly from said contact with the hygroscopic liquid into countercurrent contact with the stream of water, and removing heat from at least the cooler portions of said hygroscopic liquid by bringing portions of the hygroscopic liquid of successively lower temperatures into heat exchange relation with sections of said stream of water of successively lower temperatures.

2. A method of cooling air and water which comprises passing a stream of air in contact with successive portions of a hygroscopic liquid of decreasing temperature, progressively cooling a stream of water by the evaporative cooling effect of at least a part of said stream of air passed directly from said contact with the hygroscopic liquid into countercurrent contact with the stream of water, removing heat from at least the cooler portions of said hygroscopic liquid by bringing portions of the hygroscopic liquid of successively lower temperatures into heat exchange relation with sections of said stream of water of successively lower temperatures and removing absorbed water from the warmest portion of said hygroscopic liquid.

3. A method of cooling air and water which comprises passing a stream of air in contact with successive portions of a hygroscopic liquid of decreasing temperature, progressively cooling a stream of water by the evaporative cooling effect of at least a part of said stream of air passed directly from said contact with the hygroscopic liquid into countercurrent contact with the stream of water, and removing heat from at least the cooler portions of said hygroscopic liquid by bringing portions of the hygroscopic liquid of successively lower temperatures into heat exchange relation with sections of said stream of water of successively lower temperatures, said portions of hygroscopic liquid being continuously recirculated between the zones of direct contact with the stream of air and the zones of heat exchange with the stream of water.

4. A method of cooling air and water which comprises passing a stream of air in contact with successive portions of a hygroscopic liquid of decreasing temperature, progressively cooling a stream of water by the evaporative cooling effect of at least a part of said stream of air passed in countercurrent contact with the stream of water, removing heat from at least the cooler portions of said hygroscopic liquid by bringing portions of the hygroscopic liquid of successively lower temperatures into heat exchange relation with sections of said stream of water of successively lower temperatures and maintaining the concentration of the coldest portion of said hygroscopic liquid by the addition of hygroscopic agent thereto.

5. A method of cooling air and water which comprises passing a stream of air in contact with successive portions of a hygroscopic liquid of decreasing temperature, progressively cooling a stream of water by the evaporative cooling effect of at least a part of said stream of air passed in countercurrent contact with the stream of water, removing heat from at least the cooler portions of said hygroscopic liquid by bringing portions of the hygroscopic liquid of successively lower temperatures into heat exchange relation with sections of said stream of water of successively lower temperatures, maintaining the concentration of the coldest portion of said hygroscopic liquid by the addition of hygroscopic agent thereto and maintaining the concentration of the warmest portion of said hygroscopic liquid by the removal of absorbed water therefrom.

6. A method of cooling air and water which comprises passing a stream of air in contact with successive portions of a hygroscopic liquid of decreasing temperature, progressively cooling a stream of water by the evaporative cooling effect of at least a part of said stream of air passed directly from said contact with the hygroscopic liquid into countercurrent contact with the stream of water, and removing heat from at least the cooler portions of said hygroscopic liquid by bringing portions of the hygroscopic liquid of successively lower temperatures into heat exchange relation with sections of said stream of water of successively lower temperatures, said portions of hygroscopic liquid being continuously recirculated between the zones of direct contact with the stream of air and the zones of heat exchange with the stream of water while permitting minor proportions of the colder portions of hygroscopic liquid to pass into the next warmer portions.

7. A method of cooling air and water which comprises passing a stream of air in contact with successive portions of a hygroscopic liquid of decreasing temperature, progressively cooling a stream of water by the evaporative cooling effect of at least a part of said stream of air passed directly from said contact with the hygroscopic liquid into countercurrent contact with the stream of water, removing heat from at least the cooler portions of said hygroscopic liquid by bringing portions of the hygroscopic liquid of successively lower temperatures into heat exchange relation with sections of said stream of water of successively lower temperatures and removing absorbed water from the warmest portion of said hygroscopic liquid by subjecting the liquid to the heating action of the sun.

8. A method of cooling air and water which comprises passing a stream of air in contact with successive portions of a hygroscopic liquid of decreasing temperature, progressively cooling a stream of water by the evaporative cooling effect of at least a part of said stream of air passed directly from said contact with the hygroscopic liquid into countercurrent contact with the stream of water, removing heat from at least the cooler portions of said hygroscopic liquid by bringing portions of the hygroscopic liquid of successively lower temperatures into heat exchange relation with sections of said stream of water of successively lower temperatures and returning said stream of water to contact with the stream of air at a point corresponding in temperature with the temperature of the water being returned.

9. A method of cooling air and water which comprises passing a stream of air in contact with successive portions of a hygroscopic liquid of decreasing temperature, progressively cooling a stream of water by the evaporative cooling effect of at least a part of said stream of air passed directly from said contact with the hygroscopic liquid into countercurrent contact with the stream of water, removing heat from at least the cooler portions of said hygroscopic liquid by bringing portions of the hygroscopic liquid of successively lower temperatures into heat exchange relation with sections of said stream of water of successively lower temperatures, transferring heat to said stream of water and returning said stream of water to contact with the stream of air at a point corresponding in temperature with the temperature of the water being returned.

10. A method of cooling air and water which comprises passing a stream of air in contact with successive portions of a hygroscopic liquid of decreasing temperature, progressively cooling a stream of water by the evaporative cooling effect of at least a part of said stream of air passed in countercurrent contact with the stream of water, removing heat from at least the cooler portions of said hygroscopic liquid by bringing portions of the hygroscopic liquid of successively lower temperatures into heat exchange relation with sections of said stream of water of successively lower temperatures and maintaining the volume of said stream of water by supplying water to the zone of contact with the stream of air at a point corresponding in temperature to the temperature of the supplied water.

11. A system for cooling air and water comprising a chamber, means for establishing a stream of air through said chamber, means for bringing a plurality of streams of hygroscopic liquid into contact with said stream of air at successive points in said chamber, a second chamber, means for passing at least a portion of said stream of air directly from said first chamber into said second chamber, means for establishing a stream of water through said second chamber countercurrent to said stream of air, and means for bringing at least a part of said streams of hygroscopic liquid into heat transfer relation with said stream of water in the same relative order as the order of contact of said streams with the stream of air.

12. A system for cooling air and water comprising a chamber, a plurality of superposed liquid distributing devices in said tower, a liquid collecting device beneath each of said distributing devices, a second chamber, means for establishing an extended surface stream of water downwardly through said second chamber, a plurality of superposed heat exchange devices in said second chamber, means for passing a stream of air successively through said chambers and means for recirculating streams of hygroscopic liquid between the pairs of distributing and collecting devices of the first chamber and the heat exchange devices in the second chamber in the inverse order of their relative positions in said chambers.

13. A system for cooling air and water comprising a chamber, a plurality of superposed liquid distributing devices in said tower, a liquid collecting device beneath each of said distributing devices, a second chamber, means for establishing an extended surface stream of water downwardly through said second chamber, a plurality of superposed heat exchange devices in said second chamber, means for passing a stream of air successively through said chambers, means for recirculating streams of hygroscopic liquid between the pairs of distributing and collecting devices of the first chamber and the heat exchange devices in the second chamber in the inverse order of their relative positions in said chambers, and thermo-responsive means for controlling the passage of liquid from each of the higher circuits in said first chamber into the next lower circuit therein.

14. A system for cooling air and water comprising a chamber, a plurality of superposed liquid distributing devices in said tower, a liquid collecting device beneath each of said distributing devices, a second chamber, means for establishing an extended surface stream of water downwardly through said second chamber, a plurality of superposed heat exchange devices in said second chamber, means for passing a stream of air successively through said chambers, means for recirculating streams of hygroscopic liquid between the pairs of distributing and collecting devices of the first chamber and the heat exchange devices in the second chamber in the inverse order of their relative positions in said chambers, means for removing absorbed moisture from said hygroscopic liquid, and thermo-responsive means for controlling the passage of liquid from the lowest circuit in said first chamber to said moisture-removing means.

ROBERT B. P. CRAWFORD.